United States Patent [19]

Booth et al.

[11] 4,214,548

[45] Jul. 29, 1980

[54] APPARATUS FOR PRE-DUSTING FOOD PRODUCTS

[75] Inventors: Raymond E. Booth, Sandusky; Michael E. Miller, Bellevue, both of Ohio

[73] Assignee: Sam Stein Associates, Inc., Sandusky, Ohio

[21] Appl. No.: 936,705

[22] Filed: Aug. 25, 1978

[51] Int. Cl.² ............................................. B05C 3/00
[52] U.S. Cl. ....................................... 118/18; 118/22; 118/30
[58] Field of Search ................... 118/13, 103, 16, 100, 118/18, 423, 22, 30

[56] References Cited

U.S. PATENT DOCUMENTS

| | | | |
|---|---|---|---|
| 3,045,640 | 7/1962 | Hill et al. | 118/16 |
| 3,759,218 | 9/1973 | Korstvedt | 118/18 |
| 3,915,116 | 10/1975 | Booth | 118/16 |

*Primary Examiner*—John P. McIntosh
*Attorney, Agent, or Firm*—Baldwin, Egan, Walling & Fetzer

[57] ABSTRACT

Apparatus is disclosed for providing a very light pre-dusting coating on a food piece intended for batter-coating. The apparatus includes a movable belt on which is provided a preliminary coating of breading material on which the product pieces are placed. A series of drag plates are then provided across the belt supported from above in a position to engage the breading material on the belt and to provide a standing wave of breading material pushed up by contact with the drag plates. These plates then distribute the standing wave of breading material over the top of the product while the plate lower edges remove a majority of the top coating. After this the product goes along the belt and is then subject to a second pre-dusting treatment by a plurality of parallel linear curtain assemblies mounted above the belt with each of the curtain assemblies divided vertically into segments which are fully swingable independent of each other and arranged to engage the product pieces on the belt lightly so as to leave a final top coating on the product pieces that is only two or three dust particles thick.

11 Claims, 13 Drawing Figures

APPARATUS FOR PRE-DUSTING FOOD PRODUCTS

BACKGROUND OF THE INVENTION

A well-known process for treating food pieces prior to deep fat frying is to coat the exterior surface of the food pieces with a wet material only, or a wet material and then a dry material. The wet material is frequently called batter and will be called that herein even though the batter may be wholly egg, wholly milk, or a primarily grain flour and water formulation. The dry material is frequently called breading and will be called that herein even though the breading may be grain flour only, cracker meal, bread crumbs, or other primarily grain based formulations.

One problem associated with the process of battering and breading food pieces is that of making the batter adhere to all exterior surfaces of the food piece. Where batter does not adhere, breading will not adhere well, and the resultant finished product with bare spots is considered to be low grade. An example is in the commercial production of battered and breaded onion rings, wherein the batter will bead up on the natural surfaces of the rings rather than form a smooth coating. However, if the rings are first coated with a very thin layer of a grain flour material, the batter will form a much smoother coating and will avoid beading.

A different problem is faced in the preparation of seafood products, especially wherein fish pieces are sawed from frozen blocks, then coated with tempura style batter and immediately deep fat fried. If a usual tempura batter is applied directly onto the raw frozen fish, it has a distressing tendency to loosen or "blow-off" from the fish surface when the product is fried. When the finish fried batter is not well bonded to the fish, much of it can be lost during freezing and packing and the product becomes low grade. Numerous fish processors have found that a thin coating of a grain flour material applied to the frozen fish surfaces, before application of the tempura batter, will greatly improve the finished product quality by improving the bond between the batter and the fish. The exact mechanism of this improvement is not important to this invention. Tempura batter is commonly known in the United States as a heavy batter including leavening which causes a puffing of the batter when fried.

These two examples of applying a thin coating of floury material to food product before the application of batter and breading, or tempura batter, are called pre-dusting. Several other food products are pre-dusted in a like manner, for various reasons. The desired thickness of the pre-dust coating is usually quite thin, and may be as little as one or two flour particles thick, but has heretofore been impossible to produce dependably. Usually, the color and texture of the food piece may be seen through the coating. Clumps of predust material are usually detrimental to the process and are avoided as much as possible. The pre-dust material is usually based on wheat flour, but may contain other ingredients such as corn flour, dried whey, dried egg solids, starches, gums, leavening, seasonings and shortening.

The process of pre-dusting has been in use for years, usually involving machinery which is relatively expensive and is underutilized, or machinery which damages the product, or both. For instance, a standard breading machine with a bottom product-receiving layer and top coating layer is sometimes used, but this type machine cannot deliver a uniform and very thin top coating. In this type machine, an elevated hopper is the source for the top layer. Devices in the hopper discharge a falling curtain of breading through which the product passes while it is being carried by conveyor on a receiving layer of breading. When the falling curtain is adjusted to deposit a uniform top coating on product below, the deposition is always far heavier than is required for pre-dusting, necessitating extra effort to remove the excess. Such extra effort frequently involves flipping the product to remove the excess top cover, and flipping damages product corners and edges. When the falling curtain is adjusted to deliver a thin coating on product below, the curtain becomes very erratic and deposits a spotty layer on the product. It is difficult to modify a standard breading machine to deposit the thin coating desired for predusting, and this type machine is usually quite expensive in the first place.

Another method of pre-dusting involves tumbling the product, mixed with pre-dust material, inside a rotating drum with its axis nearly horizontal. Helical flighting or other projections inside the drum make the product move axially in the drum, and an exit screening device allows the pre-dust material to be returned for recirculation. Again, tumbling damages product corners and edges, usually more so than in a standard breading machine, as mentioned in the preceding paragraph. An additional objection to drum pre-dusting is that the product leaves the drum in a piled up narrow band which must then be separated and spread by hand for further processing. Hand spreading after pre-dusting removes or changes the predust coating in a spotty manner. A drum breader is usually less expensive than a standard breading machine, but the drum damages the product much more.

One object of this invention is to provide a relatively inexpensive means for applying thin top and side cover of pre-dust material to food product pieces. Another object is to apply the pre-dust material without damage to the product. Another object is to insure that the pre-dust coating is of the minimum thickness desired, and is uniform and without pockets or clumps of pre-dust material.

Other objects and advantages of the present invention are set forth in the specification and drawings and the essential features are summarized in the claims.

In the drawings:

FIG. 11 is a partial sectional view, enlarged, taken on line 11—11 of FIG. 10; while

It has been found that the breading machine as described in U.S. Pat. No. 3,915,116 of Raymond E. Booth, granted Oct. 28, 1975, is admirably suited to providing a moving layer of pre-dust material on which may be deposited the food pieces to be coated. Other standard breading machines may be used to provide the starting layer of breading material with which the present invention is used.

Although the machine of U.S. Pat. No. 3,915,116 can provide a good bottom coating layer for pre-dusted product, different devices, as described herein, must be used with it to accomplish good top and side coverage. The new devices described herein will achieve total top and side coverage of product pieces while maintaining a minimum thickness of pre-dust material on the product.

Figure 1:
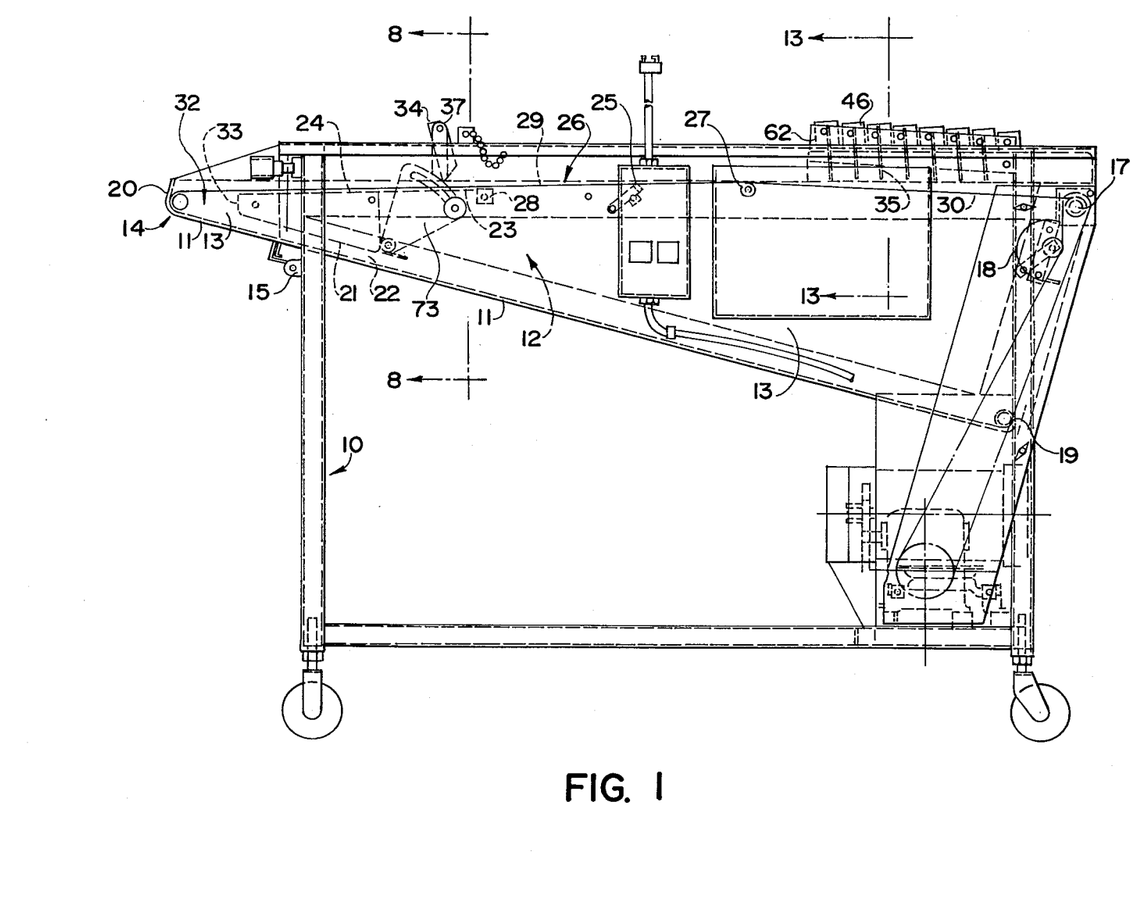
FIG. 1 is a side elevational view of the complete machine of this invention.
Figure 2:
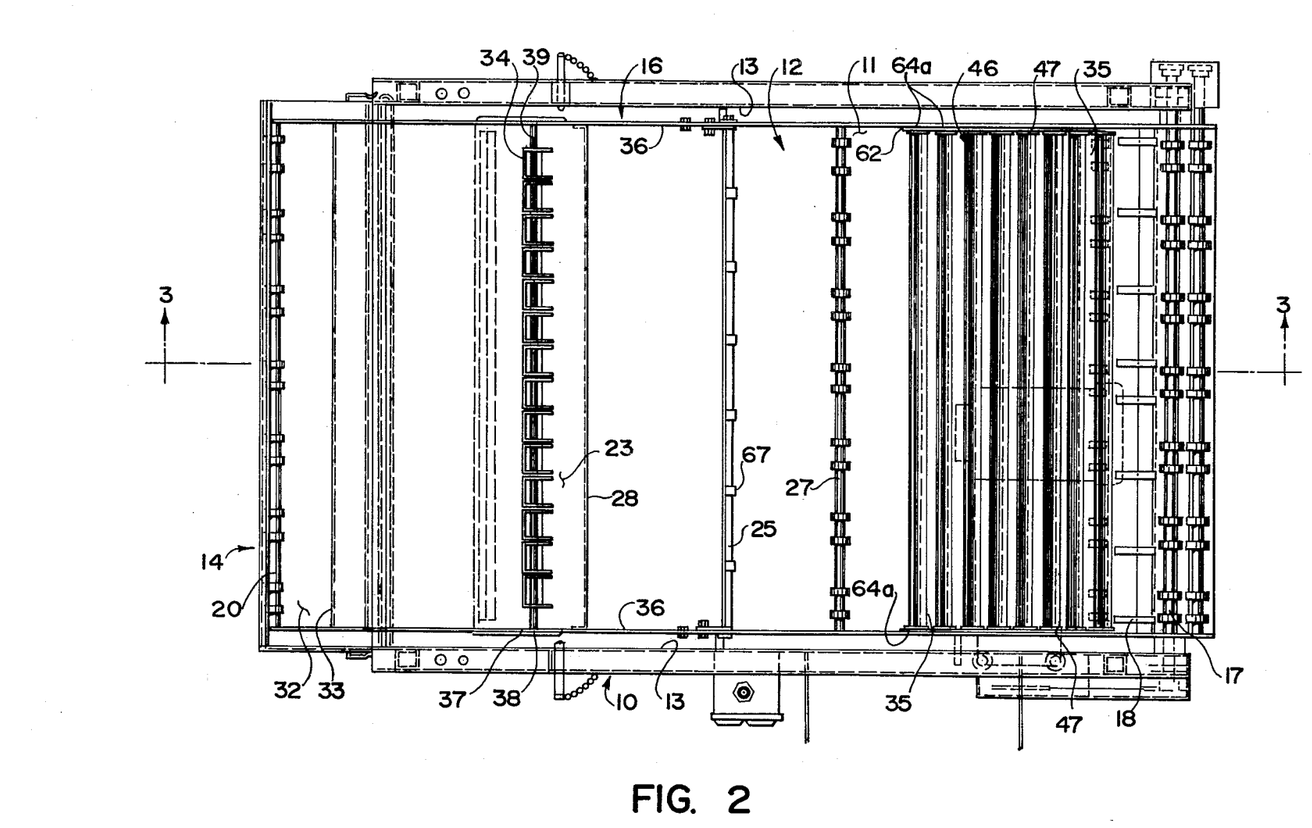
FIG. 2 is a top plan view of the same.
Figure 3:
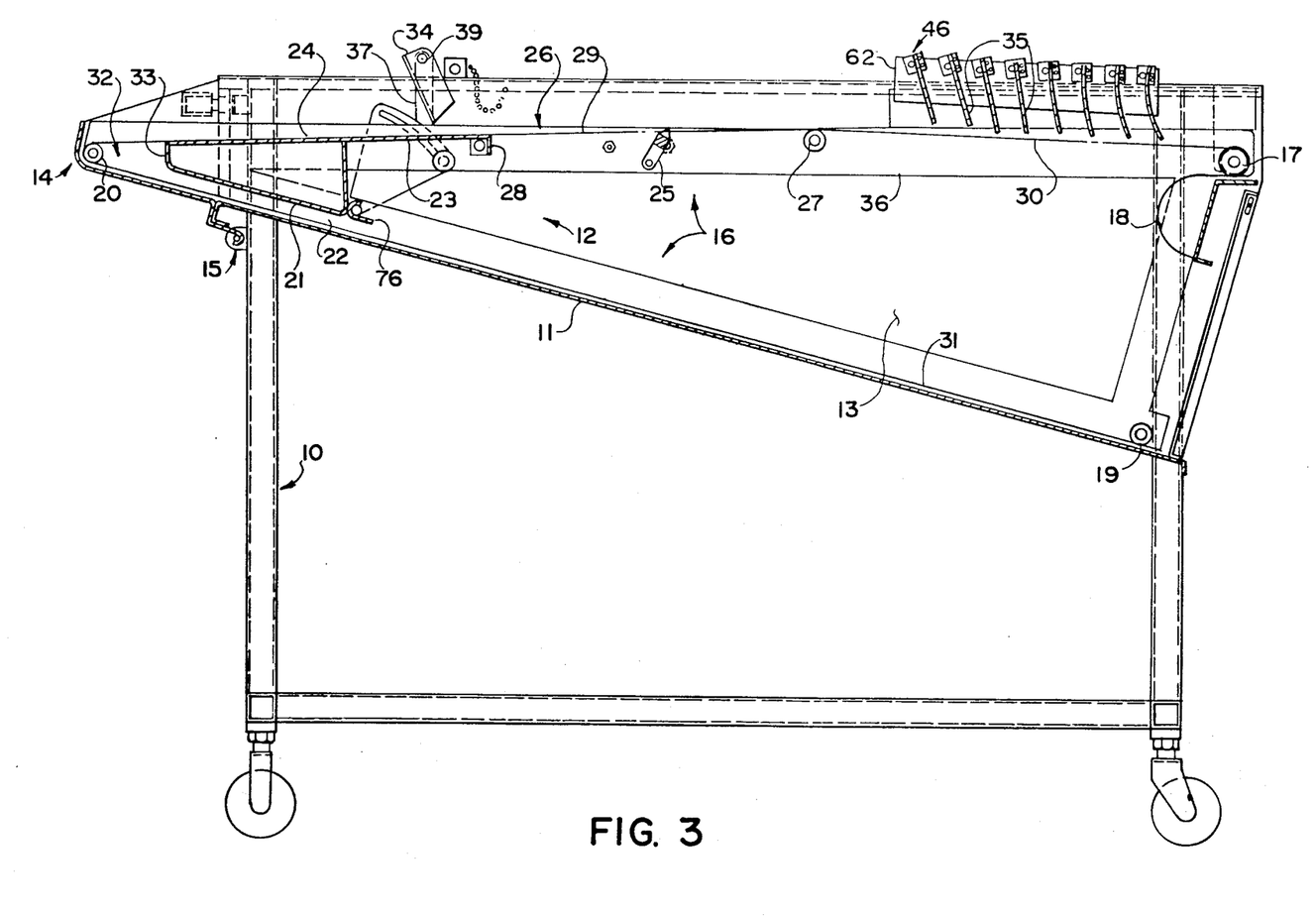
FIG. 3 is a longitudinal sectional view taken on the line 3—3 of FIG. 2.

Referring to FIGS. 1, 2 and 3, the portion of the machine covered by U.S. Pat. No. 3,915,116 includes a frame 10 which itself includes most of the sloping bottom wall 11 of a hopper 12 and most of two vertical side walls 13 of that hopper. A shroud 14 on the inlet end of the machine completes the sloping bottom wall 11 and side walls 13, the shroud being hinged at 15 to provide access for cleaning. Mounted in the hopper 12 is a conveyor frame 16 carrying a drive pulley 17 at its discharge end, an arcuate belt reverser 18 immediately below the drive pulley 17, a lower pulley equivalent 19 below the belt reverser 18, and an infeed pulley equivalent 20 at the infeed end of the conveyor 16. The conveyor frame 16 also carries the slot roof portion 21 of the pumping slot 22, the slider plate 23 under a portion 24 of the product advancing run 24, 29, 30 of conveyor belt, a belt vibrator arrangement 25 under the product run 29 of conveyor belt, and the product belt 26 itself. The conveyor frame 16 also supports an intermediate pulley equivalent 27 spaced downstream from the discharge end 28 of the slider plate 23. This pulley equivalent 27 serves to change the direction of the product run of belt by a few degrees, about seven. This small directional change serves to isolate the vibrating portion 29 of the product run of conveyor belt from that portion 30 of the product belt 26 which is under the curtains. The product belt 26, which is of open mesh wire, a suitable form shown in FIG. 16 of U.S. Pat. No. 3,915,116, has a product advancing run 24, 29, 30 between the infeed pulley equivalent 20 and the drive pulley 17. The product belt 26 also has a return run 31 which leaves the underside of the drive pulley 17, bends backwardly around the belt reverser 18, bends normally around the bottom pulley equivalent 19 and returns along the sloping bottom 11 of the frame to the underside of the infeed pulley 20. This bottom run 31 of the product belt 26 serves to pump the pre-dust material through the pumping slot 22 and up through the infeed end of the wire mesh conveyor product advancing run at 32 between the infeed pulley equivalent 20 and the infeed end 33 of the slider plate 23, as described in U.S. Pat. No. 3,915,116.

The slider plate 23 under the first portion 24 of the product advancing run serves to retain the pre-dust material above the product advancing run until the product is covered by the pre-dust material. The open space under the next portion 29 of the product advancing run of belt 26, after the discharge end 28 of the slider plate 23, permits the excess pre-dust material to return to the hopper 12 below. Such return is assisted by the belt vibrators 25. This description illustrates one way that a one-inch deep moving layer of predust material may be obtained on top of a slider plate 23. There are other ways which are usually more expensive; for instance, the bottom layer formed in a standard breading machine. The establishment of this moving layer is a prerequisite to the use of the new devices disclosed below.

Again referring to FIGS. 1, 2 and 3, the new devices of this disclosure are shown. They are the drag plates 34 and the curtains 35, whose individual functions will be described later. Each conveyor frame side bar 36 has one vertically projecting pivot rod bracket 37 fastened to its top. The brackets 37 are mounted directly across the conveyor frame from each other, at a distance upstream from the discharge end 28 of the slider plate 23 about equal to the length of the drag plates. Each pivot rod bracket 37 has a hole near the top end to allow a bolt 38 to pass through the bracket 37 and screw into the tapped end 45 of the drag plate pivot rod 39, FIG. 7. The pivot rod 39 is thus securely held between the pivot rod brackets 37.

Figure 4:
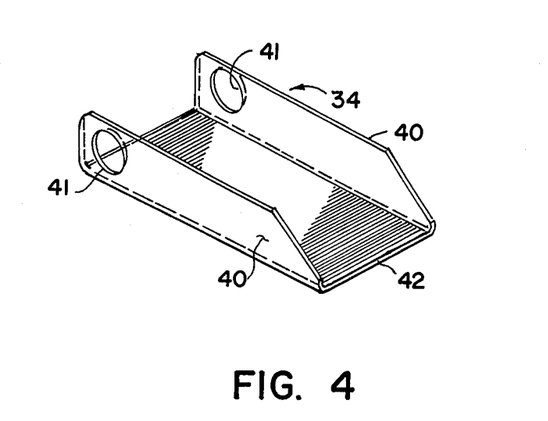
FIG. 4 is an isometric view, enlarged, of one drag plate used in this invention.
Figure 8:
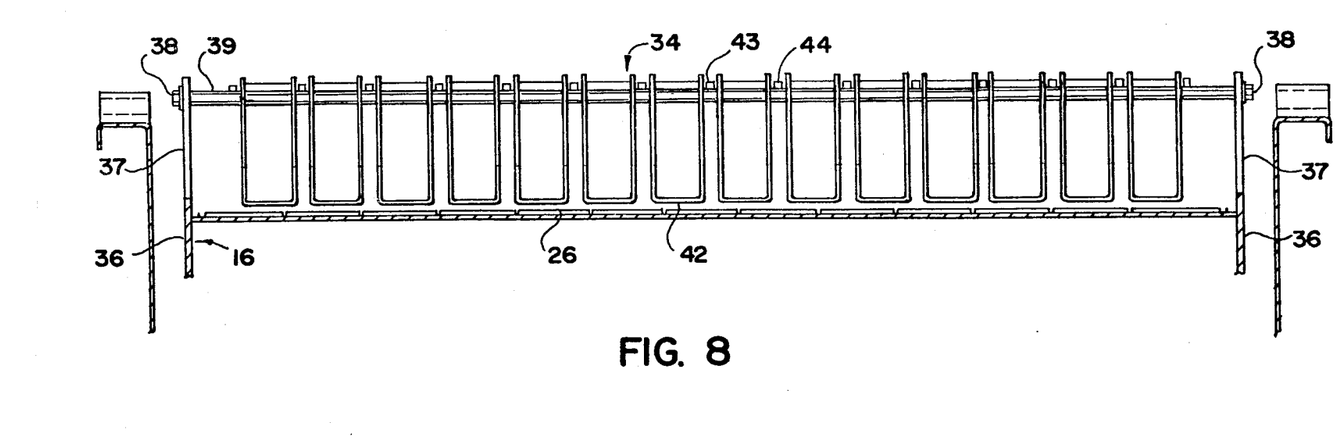
FIG. 8 is a partial sectional view, enlarged, taken on the line 8—8 of FIG. 1.

The drag plate pivot rod 39, as its name implies, serves as a pivot member for a number of drag plates 34 spaced along its length. FIG. 4 shows the detail of one type of drag plate. A piece of sheet metal, preferably stainless steel, is bent into a channel, or rectangular "C" shaped cross section, so that the flanges 40 of the channel may be pierced with pivot holes 41. These holes 41 have a diameter slightly larger, about 0.015 inches, than the diameter of the pivot rod 39 so that the drag plates 34 will swing freely when assembled onto the pivot rod 39, as seen in FIG. 8. The length of each drag plate 34 from the center of its pivot holes 41 to the free swinging end 42 is less than the distance from the center of the pivot rod to the top of the belt as seen in FIG. 3 and 8. This drag plate length in the preferred configuration is about four inches, the width is about two inches, and the metal used is 14 gauge stainless steel, about 0.075 to 0.078 inches thick. Drag plates between about 1.0 inch and 4.0 inches in width are possible.

Figure 7:
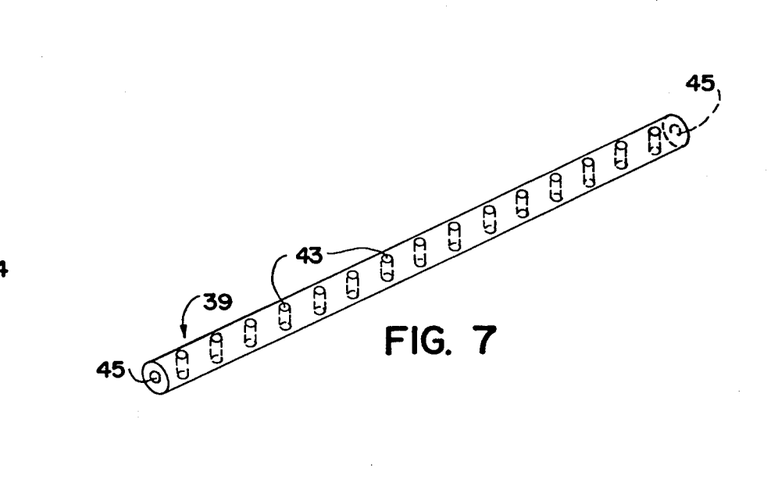
FIG. 7 is an isometric view, enlarged, of the drag plate pivot rod.

Referring to FIG. 7, the construction of the drag plate pivot rod 39 may be understood. A series of equally spaced blind holes 43 is drilled in an axially parallel line along one surface element of the pivot rod 39. Spacing of these holes is slightly greater, about 0.030 inches, than the sum of the hole diameter plus the width of one drag plate 34. FIG. 8 shows the pivot rod 39 and drag plates 34 fully assembled on the conveyor frame 16. Each of the equally spaced holes 43 in the pivot rod 39 has received a self-locking groove pin 44 which projects slightly above the surface of the pivot rod 39. The groove pins 44 serve to maintain the drag plates 34 in spaced relation along the pivot rod 39. The pins 44 are about ⅛ inch in diameter, but a closer spacing about 0.030 inch could be arranged using snap rings in place of pins 44. FIG. 8 also shows that the free swinging end 42 of the drag plates 34 will not touch the product belt 26. Clearance between 42 and 26 is usually about ¼ inch, but may be ⅛ inch to ½ inch. FIG. 8 also shows that the assemblage of drag plates 34 on the pivot rod 39 spans essentially the entire width of product belt 26.

Figure 6:
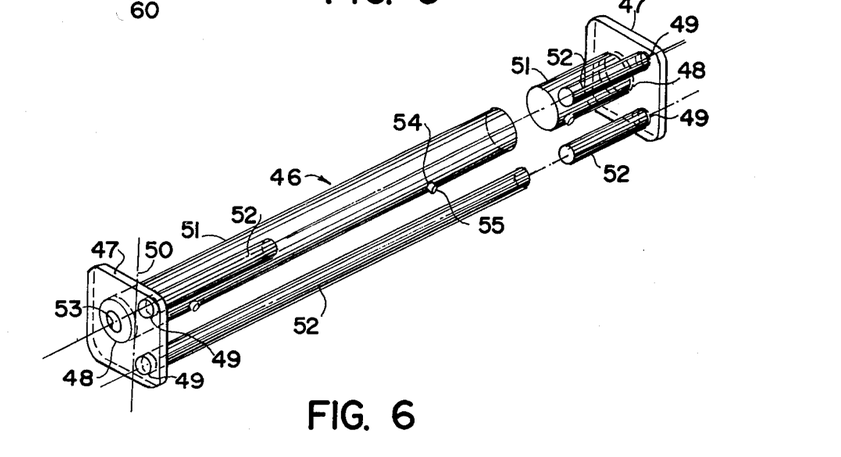
FIG. 6 is an isometric view, enlarged, of one curtain holder, partially broken away to show the construction.

Referring to FIG. 6, the construction of the curtain holders 46 may be understood. Two curtain holder frames 47 are shown, one at each end of each curtain holder 46. Each frame 47 is pierced with one larger hole 48 and two smaller holes 49 in spaced relation so that a single plane indicated by line 50 is about tangent to all three holes. The large rod 51 is inserted into the larger hole 48, and the two smaller rods 52 into the smaller holes 49, and then all rods are welded in place. A threaded hole 53 centered in each end of the large rod 51 provides a mounting means, and hole centers are pivot centers for the curtain holder 46. The large rod 51 is drilled with a number of equally spaced blind holes 54 on the side toward the tangent plane 50, each hole 54 being fitted with a self-locking groove pin 55.

Figure 5:
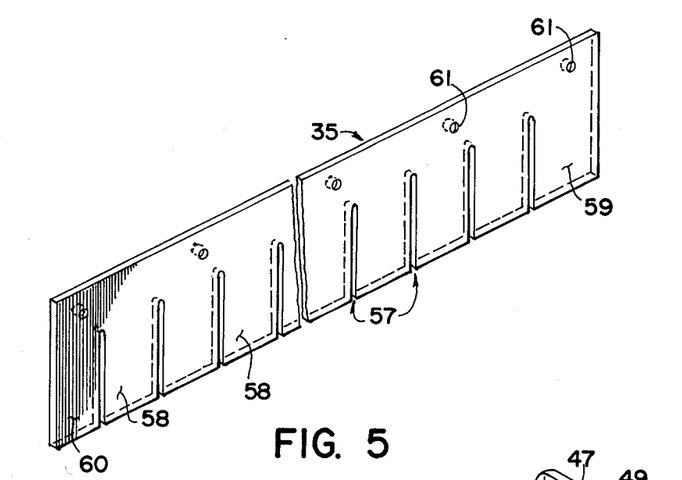
FIG. 5 is an isometric view, enlarged, of one hanging curtain, used in this invention, with the thickness exaggerated for clarity.

Referring to FIG. 5, the construction of the curtain 35 in this configuration may be understood. A single curtain 35 is a strip of thin and flexible low density linear polyethylene, the length being sufficient to span the entire width of the product belt 26, the width and thickness being mutually dependent to obtain the flexibility desired. In the preferred configuration, the width is about five inches from top to bottom and the thickness is about 0.020 inch. The curtain is slotted from the bottom edge upwardly toward the top edge with equal spaces between slots 57, about two inches in the embodiment shown, which divide the bottom edge of the curtain into segments 58. Slots 57 are a fraction of an inch wide, about one-eighth inch, to allow free relative movement of each segment, and each slot 57 is about three inches long. In this configuration of the machine the segment 59 at one end is wider than the segment 60 at the opposite end. When the curtains 35 are mounted in the holders 46 as in FIG. 3, alternate curtains are reversed end for end so that the slots 57 in successive curtains are not in line. The detail of FIG. 5 also shows a series of equally spaced holes 61 near the top edge of the curtain. The spacing and size of these holes 61 matches the spacing and diameter of the groove pins 55 in the curtain holder 46 as seen in FIG. 6. During assembly, each curtain 35 is inserted into a curtain holder 46, with pins 55 in holes 61, so that it falls into the plane indicated by line 50 in FIG. 6. The groove pins 55 project through the holes 61 in the curtain 35 to hold the curtain 35 locked in place. The rods 52, one above and one below pins 55, hold each curtain in place.

Figure 12:
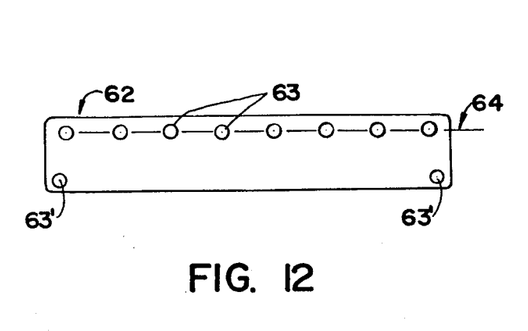
FIG. 12 is a side elevational view, enlarged, of one curtain holder bracket.

Referring to FIGS. 1, 2 and 3, the assembly and positioning of the curtains 35 may be understood. A series of curtain holders 46, one for each curtain 35, are mounted transversely to the product belt 26, in spaced relation along a portion 30 of the length of the belt. The curtain holders 46 are all mounted onto curtain holder brackets 62 located on top of each of the conveyor frame side bars 36. The curtain holder brackets 62 may be welded to the top of their respective conveyor frame side bars 36, or may be removably mounted by bolts in holes 63' (FIG. 12) to facilitate cleaning. When the assembly of curtain holder brackets 62 and all curtain holders 46 are bolted together, the assembly is a reasonably rigid unit in itself. The exact method of mounting it over the conveyor frame 16 is not too important as long as the relation of the assembly to the product belt portion 30 is defined. Thus, the brackets 62 may be solidly bolted or welded to the conveyor frame side bars 36, and the relation of curtains 35 to product belt portion 30 is exactly defined. The brackets 62 may be removably located on the conveyor side bars 36, with locating arrangements (not shown) to insure that the assembly can be returned to a known position every time. The preferred arrangement is to pivot the curtain assembly for oscillation to an open position, so that cleaning is facilitated, but the curtain assembly will not be subject to damage by total removal. As seen in FIG. 12, each bracket 62 consists of a sheet metal plate with its short dimension vertical. Each bracket 62 has a series of pierced holes 63 equally spaced along a line 64 which is about parallel to the surface of the product run 30 of conveyor belt 26. The distance of this line 64 from the surface of the conveyor belt 30 is such that when the curtain holders 46 are mounted in the brackets 62, the curtains 35 may at least touch the surface of the conveyor belt 30, or the distance may be such that the curtains 35 will interfere with the conveyor belt 30 surface by as much as one-half inch.

Each curtain holder 46 is mounted in the brackets 62 by passing a bolt 64a through each of an opposing pair of pierced holes 63 in the brackets 62 and thence into the threaded holes 53 in the large rod 51 of the curtain holder 46. When the bolts 64a are tightened, the curtain holder 46 is held in any desired fixed relation to the product belt 30 below. This relation may be changed at will, for each individual curtain holder 46, by loosening its mounting bolts 64a and rotating the curtain holder 46 as desired, then re-tightening the mounting bolts 64a.

Figure 9:
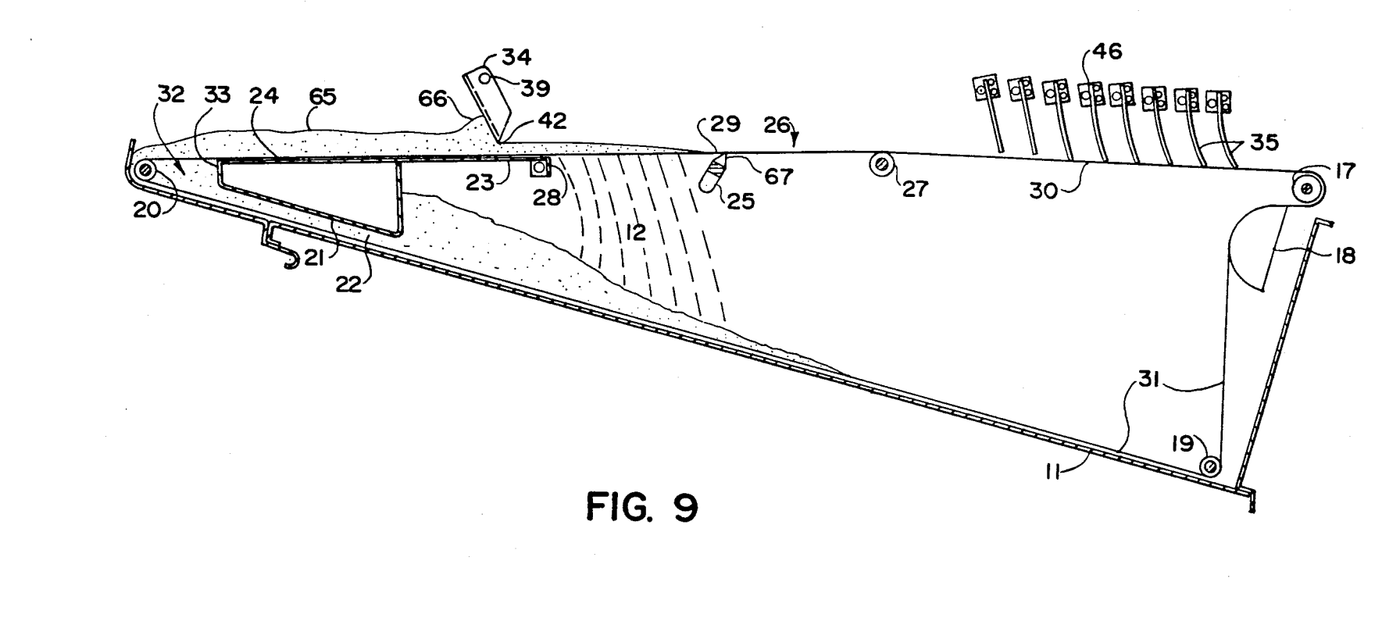
FIG. 9 is a schematic sectional view, similar to FIG. 3, showing the machine operating with pre-dust material, with no product being processed.
Figure 10:
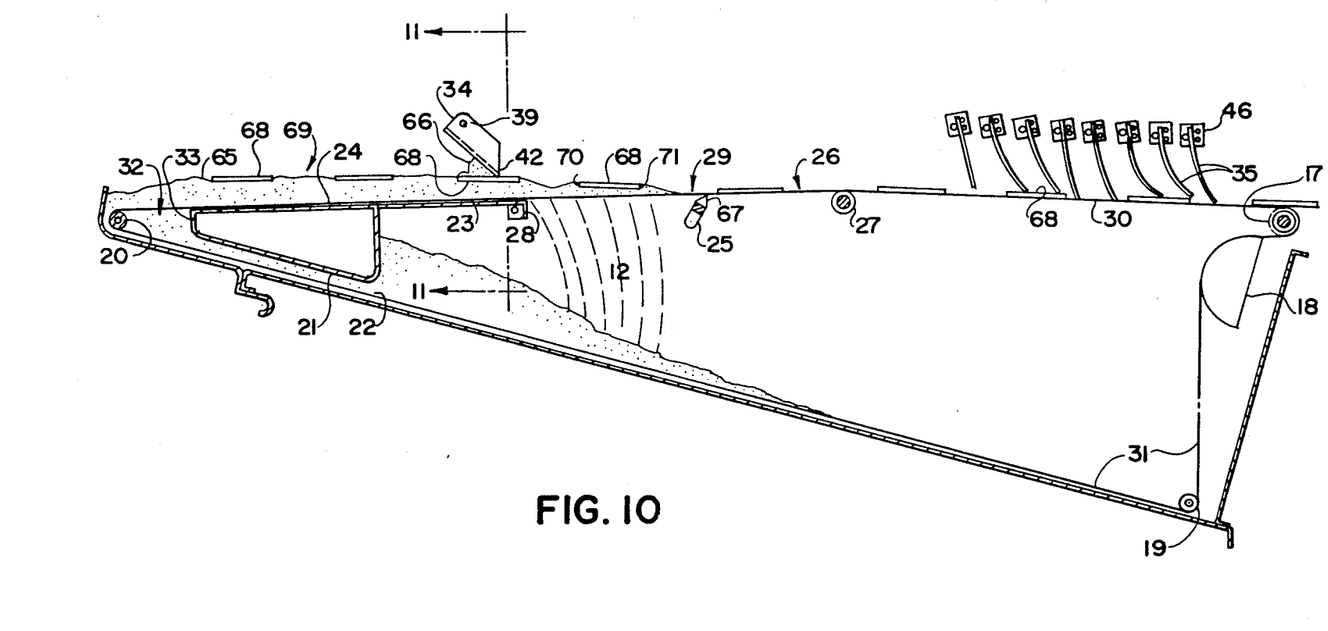
FIG. 10 is a schematic sectional view like FIG. 9, showing product being processed in the machine.

Referring now to FIGS. 9 and 10, the functions of the drag plates 34 and curtains 35 may be understood. In FIG. 9, a layer of pre-dust material 65 has been established on top of the first portion 24 of the conveyor belt 26 over the slider plate 23. This layer 65 is about one inch thick, but may be more or less depending upon the construction of the machine and the composition of the pre-dust material. The layer 65 must be thick enough that the drag plates 34 can establish a standing wave 66 of pre-dust material upstream of their lower edges 42, and the standing wave 66 must be of sufficient volume to adequately cover the product to be processed. An excessively thick layer is a minor detriment in that the excess is slightly harder to return to the hopper 12 and to remove from the product top. The layer may reasonably vary from one-half to one and one-half inches thick. As the moving layer 65 passes under the drag plates 34, the lower edge 42 of the drag plate 34 retards the upper portion of the layer. As the standing wave 66 starts to build upstream of the drag plates 34, the pressure against the upstream face of the drag plate 34 increases and the drag plate 34 pivots about the pivot rod 39, the lower edge 42 of the drag plate 34 moving toward the discharge end of the conveyor. The build-up of the standing wave 66 and the pivoting of the drag plate 34 continue until a steady state is reached within a few seconds. At this time, the standing wave 66 is at its maximum size as shown, in FIG. 19, and the drag plate 34 is pivoted sufficiently so that as much predust material passes under it as approaches it from upstream. The pre-dust material is slightly compressed at this time, by removal of entrained air, and is so shown. The standing wave 66 desired is about one inch higher than the nominal top level of the moving layer 65 of pre-dust material, but may vary from one-half to one and one-half inches above the surface of the layer 65. A low wave may be adequate to cover short pieces of product, whereas a higher wave will be necessary to cover longer pieces of product. It may be noted that with a given drag plate construction and a given pivot rod location, a thin moving layer will be coupled with a low standing wave and a thick moving layer will be coupled with a higher standing wave. It may also be noted that the standing wave size is influenced by the construction of the drag plates 34. Very heavy drag plates will not be moved much, if at all, by the standing wave 66 behind them, so the standing wave will be very large. Very light drag plates will not build up any standing wave 66. In either case, the predusting process would be unsatisfactory. A number of drag plate designs other than that shown in FIG. 4 could be made to operate satisfactorily, if they had a horizontal linear edge at the bottom, so that the construction details of the drag plates are not critical.

As the moving layer 65 of pre-dust material moves downstream from the drag plates, there is no further reason to retain the layer, so the slider plate is terminated at 28, about four inches downstream of the drag plate pivot. The excess pre-dust material may fall through the conveyor belt portion 29 to return to the hopper 12 for re-use. It is well-known that a thick layer of grain flour material will not easily pass through a belt such as the one used in this machine, so a common type of belt vibrator arrangement 25 is used to assist passage. A bar 25, crosswise of the conveyor, carries a plurality of nylon vibrator buttons 67 which interfere with the cross wires of portion 29 of the belt 26, alternately lifting and dropping the belt. This vibrating or shaking action insures that all excess pre-dust material is returned to the hopper 12 below. Downstream of the vibrator arrangement, a pulley equivalent 27 slightly changes the direction of the belt travel, about 7°, to isolate most of the belt vibration from the last portion 30 of the product run of belt 26. This isolation is advisable so that disorientation of product is minimized, and so that the belt 30 will follow a smooth path under the curtains 35.

As seen in FIG. 9, some curtains 35 may actually touch the belt when no product is under them. The curtains are shown to be adjusted so that the first curtain upstream will just clear the belt, and successive curtains drag on the belt with increasing pressure. In practice, this adjustment may be reversed, or all curtains 35 may bear relatively strongly on the product, or none may bear on the belt. The possibilities for adjustment arrangements are endless. The adjustments during processing are determined by the results obtained on the product. If not enough pre-dust material is removed from the product, one or more curtains 35 may have their adjustment changed to increase wiping action. If too much pre-dust material is removed or if product is disoriented by the curtains, one or more curtains may be re-adjusted to decrease wiping action. As noted in the above description of the curtains 35 as seen in FIG. 5, a single curtain segment 58 may be about two inches wide. Practically, curtain width may vary from 1 to 4 inches. During processing, a single segment 58 may exert a downward force on the product of about 0.25 ounce. When desired, this force may be varied over a range of 0.0 to 0.50 ounce by adjusting the curtain holder 46. It may be noted here that while the preferred configuration of the machine includes eight curtains 35, the machine could be designed to include any number. Fewer curtains may produce an unsatisfactory product by not removing enough top coating of pre-dust material, while increasing numbers of curtains become increasingly redundant.

Referring to FIG. 10, the actions of the drag plates 34 and curtains 35 on product may be seen. Product pieces 68 are placed on top of the moving layer 65 of pre-dust material at belt portion 24 by means not shown. A space 69 of sufficient length is left between successive product pieces so that the drag plates 34 may dip into the space 69 and reestablish the standing wave 66 after each product piece passes. The length of the space 69 required is relative to the length of product pieces 68 being processed, and is usually one-half to full length of the product. Normally, the space is kept as short as possible, consistent with acceptable product coverage, so that conveyor belt speed may be kept to a minimum. When product is about 4" long, open space 69 between successive product pieces 68 will usually be two to four inches, but may be less if acceptable product is still obtained.

Figure 11:
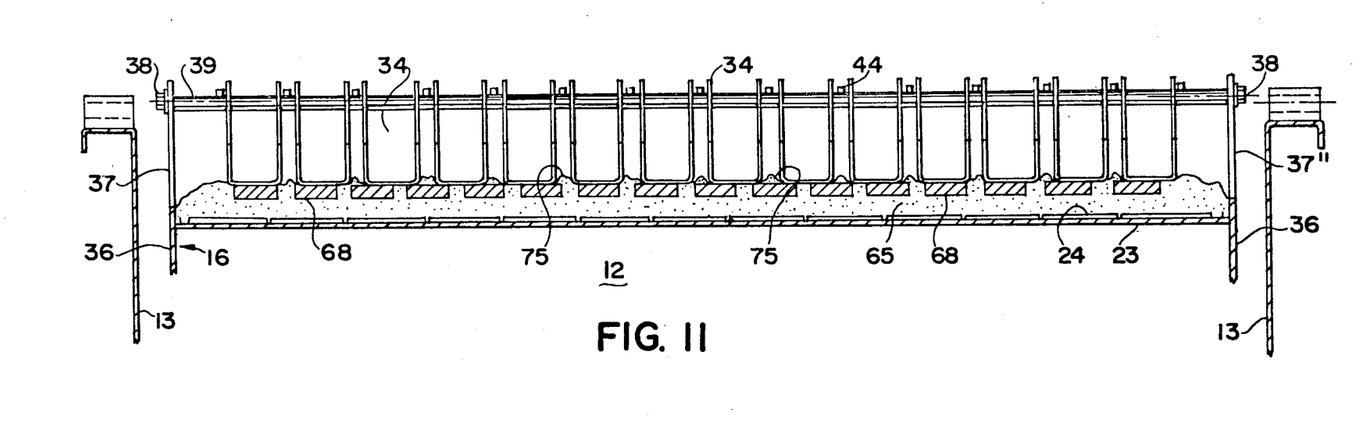

As the product is carried by the moving layer 65 toward the drag plates 34, the product encounters the standing wave 66 upstream of the drag plates 34. There is no tendency for the product piece to ride over the standing wave 66. Instead, it penetrates the upstream face of the wave 66 and top coverage begins. In FIG. 10, a product piece may be seen directly under a drag plate 34. The drag plate 34 has pivoted upwardly so that the lower edge 42 is closer to the product discharge end than it was in FIG. 9, and the lower edge 42 has lifted to ride on top of the product piece 68. As the product moves under the standing wave 66 and the lower edge 42 of the drag plate 34, the upper surface of the product is firstly deeply coated with pre-dust material, by the standing wave 66, secondly scraped by the lower edge 42 of the drag plate 34 to remove most of the deep coating. The product leaves the drag plate 34 with a thin, but possibly thicker than desired, coating of pre-dust material. The standing wave 66 has been diminished in volume by the amount of pre-dust material retained on the product piece and by the amount that covers the ends at 70 and 71, and that falls off the sides of the product piece. FIG. 11 shows that the product leaving the drag plate area is completely covered by pre-dust material, with transverse spaces between product pieces being completely filled to the top of product pieces, and with ridges 75 of pre-dust material showing on top of product pieces 68 between drag plates 34. The ridges are formed by pre-dust material passing through the spaces between adjacent drag plates 34. The reduction of the standing wave volume as described is usually more than fifty percent, but must not be one hundred percent, for then all the product piece 68 may not be top coated. This considerable reduction is the reason the standing wave 66 must be re-established after every product piece passes.

Referring again to FIG. 10, the moving layer 65 of pre-dust material and its included product pieces 68 move past the discharge edge 28 of the slider plate 23. The excess pre-dust material falls away from the bottom, ends and sides of the product piece and returns to the hopper 12, assisted by belt vibration as described for FIG. 9. The product pieces 68 then pass over pulley equivalent 27 and under the series of curtains 35. As may be seen in FIG. 10, the curtains 35 are deflected by the product pieces 68. The lower edge of the curtain segments 58 wipe over the top surface of the product pieces 68, distributing any of the ridges 75 described in FIG. 11, and removing excess pre-dust material from the top of the product pieces 68. This excess, again, returns to the hopper 12 for re-use. The wiping action of each curtain segment 58 is so gentle that multiple wipes are used to remove excess pre-dust material down to the residual coating desired. The thickness of the pre-dust coating, and the method for adjusting it have been previously described. Product may now pass over the discharge pulley equivalent 17 and go on to further processing. The reference 76 on FIG. 3 is to vary the size of the pumping slot 22.

Figure 13:
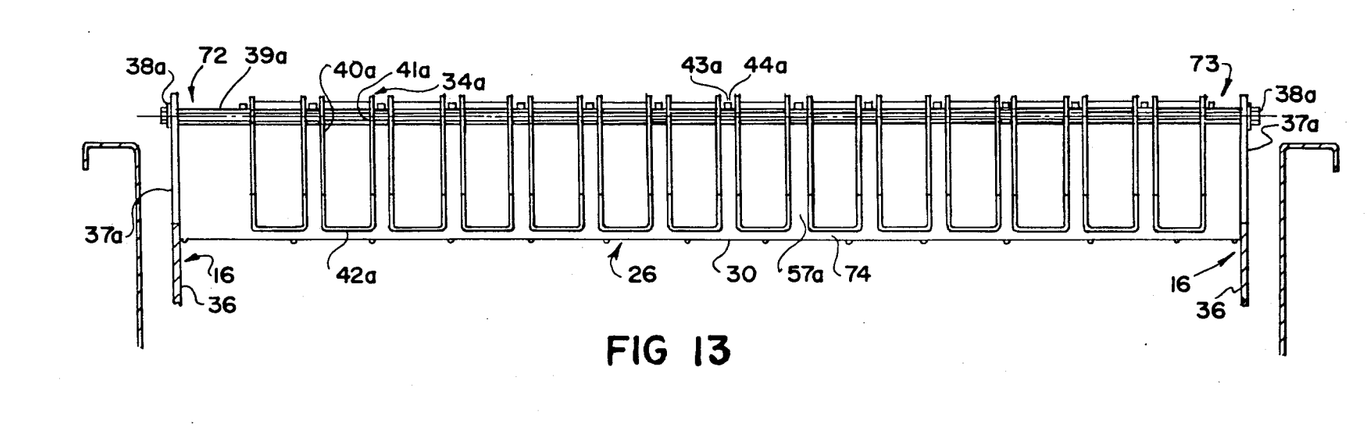
FIG. 13 is a partial sectional view showing an alternate curtain construction of light-weight drag plates which may replace the curtains 35 but usually would require also the drag plates 34.

The curtains 35 may be replaced by a plurality of rows of light-weight drag plates hung as a series of drag curtains, such as shown in FIG. 13.

The drag plates 34a are nearly identical in appearance to the drag plates 34 of FIG. 4, however, the diameter of the hole 41a in the side flange 40a of drag plate 34a must be at least 0.030 inch greater than the diameter of pivot rod 39a. This greater diametral clearance allows the drag plate 34a to better follow the slight surface irregularities of flat product pieces to obtain smooth even coverage. Also, the material thickness of drag plate 34a is thinner than that of drag plate 34, the former being 0.018 to 0.029 inch thick. The light-weight construction of drag plates 34a is necessary for two reasons. Firstly, the product pieces must not be slowed or disoriented when first touching or passing under the trailing edge 42a. Secondly, the contact force on top of the product piece must be very light, about 0 to 0.5 ounce per two inch wide segment of curtain as described above for FIG. 9, so that the correct layer of pre-dust material may be maintained on the product.

The pivot rod 39a in FIG. 13 is very similar to pivot rod 39 as shown in FIG. 7. However, the group of pin holes 43a in pivot rod 39a are off center of the rod length, so that the space 72 from one rod end to first pin hole 43a is greater by at least ½ inch than the space 73 from the last pin hole 43a to the other rod end.

Another difference in FIG. 13 is that the clearance 74 between the product belt 26 and the trailing edge 42a of the drag plate 34a must be adjustable for different thicknesses of product, and to assist in obtaining the desired contact force between the trailing edge 42a and the product pieces. For this reason, the pivot rod brackets 37a are pierced with vertical slots near their top end. The bolts 38a pass through the slots and into tapped holes in each end of the pivot rod 39a. Thus, the pivot rod 39a may be locked in any desired position, to increase or decrease clearance 74 as required.

FIG. 13 shows only one metallic drag curtain assembly, off center to the right of the figure because space 72 is greater than space 73. It may be readily understood that a series of these metallic curtains are mounted in the machine, with the pivot rods 39a of alternate drag curtain assemblies reversed end for end, so that half the drag curtain assemblies would appear as shown, and the other half would have the longer space 72 on the right with the shorter space 73 on the left. When the series of metallic drag curtains are mounted as described, the slots 57a in successive metallic curtain assemblies will never be in line; therefore, ridges of pre-dust material will be reliably removed from the top surface of the product.

It will be understood that a pre-dusting machine may be equipped with a multiple of metallic drag curtains as described in FIG. 13 in lieu of a multiple of thin polyethylene curtains as described in FIGS. 5 and 10. The advantage of metallic curtains is their durability when subjected to repeated temperature changes and harsh chemicals during cleaning. Their disadvantage is that they are only suitable when the product top is quite flat.

Now that the functions of the drag plates and curtains are understood, some further discussion in helpful in understanding the permissible variations in each, and the variations in product which may be pre-dusted. The preferred configuration of the drag plates is shown in FIG. 4 and is described in the discussion of that drawing. Numerous other drag plate configurations could be used with equal or nearly equal effectiveness. For instance, the same general channel shape in lighter gauge metal with wider flanges would work as well. Metals other than stainless steel could be used as long as construction is sanitary. The drag plates could be cast aluminum or molded synthetic plastic, with different configurations to suit the material and method of fabrication. Many other changes are possible and acceptable, as long as the resultant drag plate will form an acceptable standing wave, and will pivot easily to spread the wave volume over the product. The width of each drag plate, preferred to be about two inches, may be of almost any dimension larger or smaller, as long as its function is not impaired. For instance, a single drag plate the full width of the belt would be unacceptable because it would not be easily pivoted by a single piece of product. Regardless of the drag plate width used, there will always be instances when a single product piece passes under more than one drag plate. If the plates are too wide, the product may be excessively retarded by wider and heavier plates. Conversely, the drag plates may be narrowed considerably, and narrow plates will follow irregular product much more dependably. However, machine cost rises with increasing numbers of drag plates, and ridges of pre-dust material between drag plates also increase. The two inch nominal width of the preferred configuration of the drag plate in FIG. 4 is an acceptable compromise between all considerations. Drag plates may vary between one inch and four inches in width.

The preferred configuration of the curtains is shown in FIG. 5 and is described in the discussion of that drawing. Numerous other configurations may be acceptable. For instance, a thinner sheet of high density polyethylene, say 0.010 inch thick, of the same width of five inches, may be used to obtain a similar curtain flexibility. The slot width 57 and spacing thereof can be considerably changed, as with the drag plates, with similar results. An unslotted curtain cannot reliably follow the contours of multiple pieces of product, while a curtain with a gross multitude of slots may become nearly ineffective in removing excess pre-dust material. For instance, a curtain with closely spaced and parallel knife cuts may closely resemble a brush with a single row of bristles. As such curtain segments follow minute irregularities in the product surface, the "bristles" separate until the open space between them may be wider than the sweeping edge of the segment. This will result in mere deflection of excess pre-dust material rather than removal. As a matter of fact, the use of brushes to remove excess breading was tried over twenty years ago by a pioneer manufacturer of breading machines. The attempt was quickly abandoned when brushes proved to be totally unacceptable for excess breading removal. It may be noted that the brush configuration can perform an acceptable job of distributing an irregular coating over a surface, if the original coating is spotty or in clumps. However, the formation of an acceptable pre-dust coating usually includes removal of excess pre-dust material. The brush configuration will not do this in a reasonable manner. Another drawback to the use of brushes is their inherently unsanitary construction. The great multitude of tiny interstices between bristles precludes dependable cleansing. The preferred configuration for the curtains is an acceptable compromise between all considerations, but is not the only acceptable compromise.

The variations in products that are pre-dusted are large. Natural onion rings as coated by major processors are usually the outer rings only while the core and end rings are used for other purposes. A single ring may weigh from one-eighth to one-half ounce, and may be from one and one-half to three inches in diameter. A fish stick or finger may be one-half to one ounce in weight, three quarters to one inch wide, three to four inches long. A fish wedge may be up to three ounces in weight, and average one and one-half inch wide by four inches long. A fish portion may double the area of a wedge. Natural fish portions or fillets are usually limited in weight to six ounces or less, but may be almost any configuration. They are notably wavy, twisted or curled when processed in the frozen state. All of these product variations, and more, may be successfully pre-dusted in the machine herein described. The preferred configuration of the drag plates permits individual satisfactory top and side pre-dusting of many, and irregular, shapes, while the configuration of the multiple curtains insures that excess pre-dust material is acceptably removed from the product.

Another variation encountered during pre-dusting is some inevitable randomness of product placement during loading of the pre-duster machine. Product is usually separated and spread on a feed conveyor upstream of the pre-duster machine, then the feed conveyor deposits the product on the moving layer in the pre-duster machine. A main consideration during this spreading operation is that product pieces do not touch on their sides, for such touching may continue through pre-dusting which would then reduce side coating dependability. In fact, about one-half inch or more is desirable side clearance between product pieces. Another consideration during spreading is that product pieces must not overlap in the direction of product movement. The pre-duster conveyor always moves faster than the feed conveyor, so product centers are further apart on the pre-duster. But any overlap between pieces on the feed conveyor will reduce end clearance between successive product pieces during pre-dusting. The necessity for an open space between successive pieces has already been discussed.

It might be understood that extreme care would have to be exercised during spreading on the feed conveyor to insure that a regular pattern of product is maintained through the pre-duster. Fortunately, this extreme care is not necessary with this invention, for it is expensive. The arrangement of drag plates and slotted curtains will perform well regardless of the randomness of the product pieces. If drag plates or curtain segments are made wider than the preferred configuration, their ability to cope with random product decreases as width increases.

Lane guides could be provided in this machine and, in such case, each lane would have its own drag plate, or plates 34, and each lane would have its own curtain, or curtains, 35. Such lane guides are not recommended.

The belt portion 30 under the multiple curtains 35 may be supported in several ways when it is deemed necessary. Additional intermediate pulley equivalents 27 may be spaced as desired, or longitudinal belt supports may be used, or both.

It may also be noted that a multiple of either type of segmented curtain arrangements could be used on a standard breading machine to spread a thin and spotty layer of pre-dust breading material over the top of product pieces and then remove most of the top cover. This would increase the adaptability of a standard breading machine to the process of pre-dusting, hence would increase its versatility in production operations. It is apparent that the use of multiple arrangements of segmented curtains is not dependent upon prior use of drag plates 34 to obtain top cover of a product.

None of these variations should detract from the novelty of the drag plates as a means for applying a thin top and side cover of pre-dust material to a variety of product pieces, nor to the novelty of using a series of segmented curtains for removal of excess top coating of the pre-dust material. The average result obtained with this invention is 0.0312 to 0.0625 inches of top coating after drag plates 34, which includes spreading of ridges 75, and a top coating of one to three dust particles thick after curtains 35. Color differences on the food product can be seen through the coating there.

What is claimed is:

1. Apparatus for providing a very light pre-dusting coating on a food piece intended for batter-coating, comprising a frame having parallel longitudinally extending side frame members, a movable wire mesh conveyor belt on said frame having a generally horizontal coating run across said frame, means for driving said conveyor belt, a flat slider plate on said frame beneath a first product-piece-receiving portion of said run, means for depositing a layer of pre-dusting breading material on said belt above said slider plate, drag plate means pivotally mounted on said frame above said first portion of said run and near the downstream end of said slider plate, the length of said drag plate means from its pivotal axis to its free swinging lower end being less than the distance from said drag plate means pivotal axis to said conveyor belt, and the width of one plate of said drag plate means transverse to the belt being preferably less than said length, whereby with a layer of predetermined thickness of said pre-dusting breading material on said first portion of said run, said drag plate means will hold back a standing wave of said pre-dusting breading material after which a food product piece on said layer will be carried through said wave to cover the top surface of said product piece.

2. Apparatus as defined in claim 1, including a breading material reservoir in said frame beneath said horizontal coating run and downstream from said slider plate, and said means for depositing said layer of pre-dusting breading material on said belt includes means for moving said breading material out of said reservoir and up to said belt.

3. Apparatus as defined in claim 2, including means for vibrating said conveyor belt downstream from said slider plate, whereby excess pre-dusting breading material may be dislodged from the sides, ends and bottom of a food piece.

4. Apparatus as defined in claim 1, wherein pivotal mounting of said drag plate means includes a drag plate means pivotal bar, said bar mounted on said side frame members, and a plurality of drag plates independently mounted side by side on said pivotal bar, whereby each drag plate swings independently.

5. Apparatus as defined in claim 1, including a second product-carrying run of said conveyor belt downstream from said product-receiving portion, a plurality of parallel linear curtain assemblies mounted on said frame over said second product-carrying run, each curtain assembly being divided vertically into segments freely swingable independently of other segments, and each curtain assembly being of a length to interfere with said conveyor belt not more than one-half inch, whereby any excess of pre-dusting breading material may be gently scraped from the tops of product pieces by the lower edges of said segments.

6. Apparatus for providing a very light pre-dusting coating on a food piece intended for batter-coating, comprising a frame having parallel longitudinally extending side frame members, a movable wire mesh conveyor belt on said frame having a generally horizontal coating run across said frame, means for driving said conveyor belt, a flat slider plate on said frame beneath a first product-piece-receiving portion of said run, means for depositing a layer of pre-dusting breading material on said belt above said slider plate, a second product-carrying run of said conveyor belt downstream from said product-receiving portion, a plurality of parallel linear curtain assemblies mounted on said frame over said second product-carrying run, each curtain assembly being divided vertically into segments freely swingable independently of other segments, and each curtain assembly being of a length to interfere with said conveyor belt not more than one-half inch.

7. Apparatus as defined in claim 6, wherein at least one of said curtain assemblies located upstream extends toward said conveyor belt to a lesser extent than curtain assemblies located downstream thereof.

8. Apparatus as defined in claim 6, wherein said curtain assemblies are of synthetic resin material.

9. Apparatus as defined in claim 6, wherein said curtain assemblies are of sheet metal material.

10. Apparatus as defined in claim 6, where at least some of said curtain assemblies are mounted on said frame for vertical adjustment.

11. Apparatus as defined in claim 6, wherein any of said curtain assemblies may be individually adjusted to extend to a greater or lesser extent toward said conveyor belt than other of said curtain assemblies.

* * * * *